Dec. 8, 1936.                    C. FIRTH                    2,063,798
                APPARATUS FOR PREPARING SHEETS FOR WELDING
                Original Filed Nov. 14, 1930     8 Sheets-Sheet 1

Dec. 8, 1936.  C. FIRTH  2,063,798
APPARATUS FOR PREPARING SHEETS FOR WELDING
Original Filed Nov. 14, 1930  8 Sheets-Sheet 5

INVENTOR
Cyril Firth
by his attorneys
Byrnes, Stebbins, Parmelee & Blenko Dec. 8, 1936.    C. FIRTH    2,063,798
APPARATUS FOR PREPARING SHEETS FOR WELDING
Original Filed Nov. 14, 1930    8 Sheets-Sheet 6

INVENTOR
Cyril Firth
by his attorneys
Byrnes, Stebbins,
Parmelee & Blenko

Patented Dec. 8, 1936

2,063,798

UNITED STATES PATENT OFFICE 2,063,798

APPARATUS FOR PREPARING SHEETS FOR WELDING

Cyril Firth, Youngstown, Ohio, assignor to The Youngstown Sheet & Tube Company, Youngstown, Ohio, a corporation of Ohio Original application November 14, 1930, Serial No. 495,652. Divided and this application November 3, 1932, Serial No. 641,006

5 Claims. (Cl. 29—33)

The present invention relates broadly to the art of metal working, and more particularly to an improved apparatus by which sheets, plates or the like adapted for the formation of tubular articles are prepared for a welding operation.

This is a division of my copending application, Ser. No. 495,652, filed November 14, 1930, for Method for preparing sheets for welding.

While the utility of the present invention is not limited with respect to the particular characteristics of the metal bodies on which the preliminary operations are performed, such bodies will hereinafter be referred to as sheets, it being understood that such expression is used generically as a word of definition and not as a word of limitation.

In the commercial production of tubular articles by welding, it is customary to shear the sheets to the desired width and for the purpose of trimming the edges, then form the sheared sheets into substantially circular cross section, and thereafter subject the preformed sheets to a welding operation in a suitable type of welding apparatus. Irrespective of the characteristics of the apparatus, the degree of perfection obtained in the weld is governed at least to a large extent by the characteristics of the edge portions between which the seam is formed. If such edge portions are substantially straight and true and are so held during the welding operation as to preclude overlapping thereof, desirable results may be obtained.

It has been found, however, that the production of an efficient weld is usually obtainable only by a suitable preliminary heating operation followed by a subsequent pressure application capable of exerting sufficient pressure to bring the heated portions into the desired welding relationship. Such pressure is not infrequently sufficient to produce a partial riding of one sheet over the other or partial overlapping in such manner that the finished product is necessarily a compromise of the contemplated result.

In order to obviate this objection, it has heretofore been proposed to subject the sheets to a preliminary shaping or edge thickening operation by means of which the edge portions are thickened to such an extent that the area of contact therebetween in a direction radially of the tubular article is increased beyond that afforded by the thickness of the parent stock, whereby the tendency to overlap is proportionately reduced. The present invention has for one of its objects to provide an improved means for accomplishing such a thickening operation and for simultaneously sizing the sheets so as to provide blanks of accurate width, any excess or deficiency of metal in the sheared sheets being compensated for in the extent of thickening of the edge portions.

It is also customary in the commercial production of articles of the character hereinbefore referred to, to subject the sheets to an edge shearing or edge trimming operation in advance of the forming operation, whereby to improve the accuracy of the sheets and the straightness of the edge portions. In the ordinary edge shearing operation, the shearing is accomplished by means of rotary shear blades, a pair of which is provided adjacent each edge with the shearing edges offset the required extent to permit the performance of the shearing step. As customarily mounted, the bottom shear blades are inside of the upper shear blades so that the finished sheet presents a bead or burr projecting downwardly from the sheared edge a greater or lesser amount depending upon the characteristics and efficiency of the shears themselves. Thereafter, the sheared sheet is subjected to a forming operation which brings the bottom surface of the sheet on the outside of the cylindrical blank, so that the burrs formed by the shearing operation project upwardly from the parent body along opposite sides of the proposed line of weld.

I have found that such a condition is objectionable and interferes with the proper welding operation. In accordance with the present invention, I re-locate the edge trimming shears in such manner that the upper shears lie within the shearing plane of the bottom shears whereby the burr formed by the trimming operation projects upwardly from the parent body in such manner that a subsequent forming operation will cause such burrs to project inwardly toward the center of the tubular body rather than outwardly as heretofore. In this manner, even without an edge thickening operation, the results obtained are materially improved. I have found, furthermore, that during an edge thickening operation on a previously trimmed sheet, the thickening effect is more pronounced on the side with the burr than on the opposite side, whereby the major portion of the thickened metal is disposed inwardly of the formed blank in such position as to permit the production of an efficient weld.

The present invention therefore also contemplates means for shearing to produce a burr and shaping to cause the burr sides of the sheet to lie inwardly of the formed blank, and preferably also means for performing an edge thickening operation on a previously trimmed sheet such that the major portion of the upset metal lies on the side of the burr and means for subsequently shaping the sheet to bring the major portion of the thickened edges inwardly of the formed blank.

In the accompanying drawings, I have shown for purposes of illustration only certain preferred embodiments of the present invention. In the drawings.

Figures 1, 2:
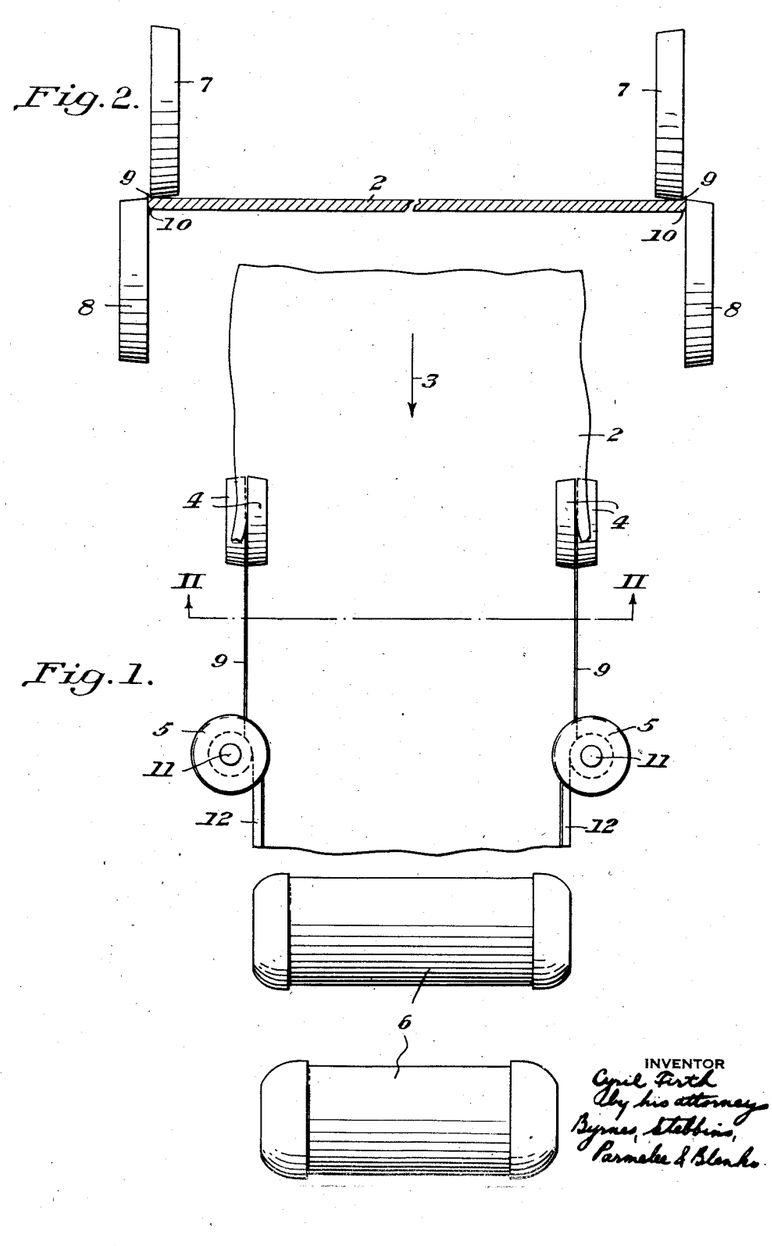
Figure 1 is a diagrammatic top plan view illustrating the means for shearing, edge thickening and preliminary forming.
Figure 2 is a transverse sectional view on the line II—II of Figure 1, looking in the direction of the arrows.

Referring first to Figures 1 and 2 of the drawings, I have indicated a sheet 2 traveling in the direction of the arrow 3, through edge trimming shears 4, edge thickening means 5 and blank forming means 6, all of which are indicated diagrammatically in part only. From Figure 2, it will be apparent that each of the edge trimming shears comprises an upper rotor or blade 7 and a lower rotor or blade 8, the upper blades being so mounted as to lie within the shearing plane of the lower blades. Due to this positioning of the parts, the shearing operation forms adjacent each edge of the sheet an upwardly projecting burr 9, the opposite surface of the sheet being characterized by a slight curvature or fillet 10.

After having been subjected to an edge trimming operation, the continued travel of the sheet brings it to edge thickening means 5, herein illustrated as comprising rolls or the like mounted on vertical shafts 11 and effective not only for sizing the sheet by compressing the same laterally, but for flattening the burr and disposing the excess material into a thickened edge portion 12, the major portion of which lies on the upper side of the sheet, or the side on which the burr was formed by the edge trimming operation.

After the edges have been thickened in the manner described, the continued travel of the sheet brings it into engagement with suitable forming means herein illustrated as comprising a series of roll passes, only two of which are illustrated and effective for gradually bending the edge portions upwardly until a substantially cylindrical blank is produced. Such a blank having been produced by an upward and inward bending of the edges of the sheet, it will be apparent that the predominating portion of upset metal adjacent the thickened edges lies within the body of the blank for reasons hereinbefore pointed out.

It will be apparent to those skilled in the art that while I have herein illustrated forming means as comprising a series of roll passes, any other desired type of forming means, such as the so-called "caterpillar" or endless belt type of formers including a series of traveling dies may be utilized, the particular construction of the forming means constituting no essential part of the present invention.

In Figures 3 to 7, of the drawings, there is illustrated in detail one form of edge thickening means which has been found in actual practice to give extremely desirable results. Such an edge thickener as illustrated in these figures comprises an upper shaft 14 and a lower shaft 15, on each of which is mounted a series of intermediate rollers 16, adapted to engage the intermediate body portions of the sheet 2 and maintain the same substantially flat during the time that the sheet is being subjected to an edge upsetting or thickening step. The thickening per se is accomplished by side rolls 17, illustrated diagrammatically at 5 in Figure 1, carried by shafts 18, each of the side rolls having a peripheral thickening groove 19 provided therein and adapted to receive the edge portions of the sheet and control the upsetting operation. Each shaft 18 is carried in a suitable housing 20, which housings are adapted to be moved inwardly or outwardly at the pleasure of the operator for controlling the extent of edge thickening. It will be apparent that as the housings are adjusted inwardly one toward the other, the sheet passing therethrough is subjected to a greater edge thickening than is the case when the housings are moved outwardly. In this manner, accuracy of sizing as well as accuracy of thickening is easily obtained.

Figure 6:
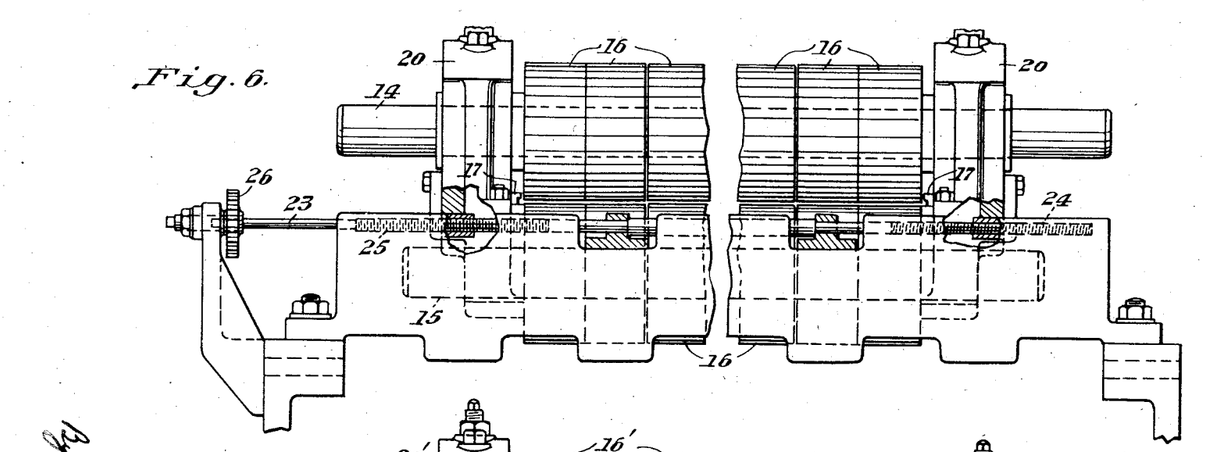
Figure 6 is a detail sectional view illustrating a portion of the adjusting mechanism for the edge thickening apparatus.
Figure 7:
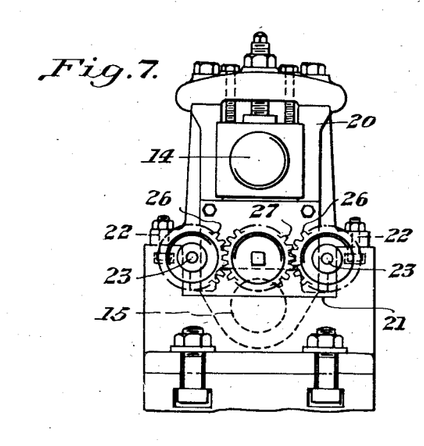
Figure 7 is an end elevational view of the apparatus illustrated in Figure 6.

For accomplishing such an adjustment, I have illustrated the housings 20 as slidably mounted in suitable ways 21 to which they may be bolted in adjusted position by bolts 22. Cooperating with the housings is a pair of screw shafts 23 having adjacent one end threaded portions 24 with the threads extending in one direction, and threaded portions 25 adjacent the opposite ends extending in the opposite direction. Each of the screw shafts carries on one end a gear 26 which gears are tied together for simultaneous rotation through the medium of an intermediate gear 27 adapted to be operated in any desired manner in one direction or the other for effecting the desired adjustment of the housings 20 and the edge thickening rolls 17 carried thereby.

Figure 8:
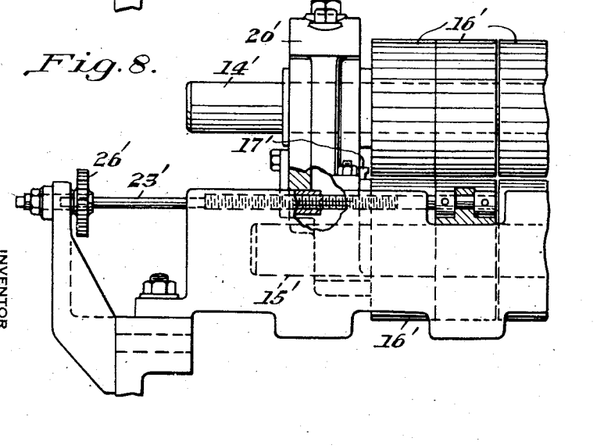
Figure 8 is a view similar to Figure 6, illustrating a modified form of adjusting means.

In Figure 8, there is illustrated a slightly different embodiment of the invention, in which parts corresponding to the parts already described are designated by the same reference characters having a prime affixed thereto. The construction of Figure 8 differs in the fact that the screw shafts 23' are discontinuous whereby individual adjustment of either of the housings 20' may be effected independently of the other housing. In certain cases, due to mill location or construction, it may be desirable or necessary to effect a greater adjustment at one side of the mill than the other. A construction as illustrated more particularly in Figure 8 enables this to be conveniently accomplished.

Figure 3:
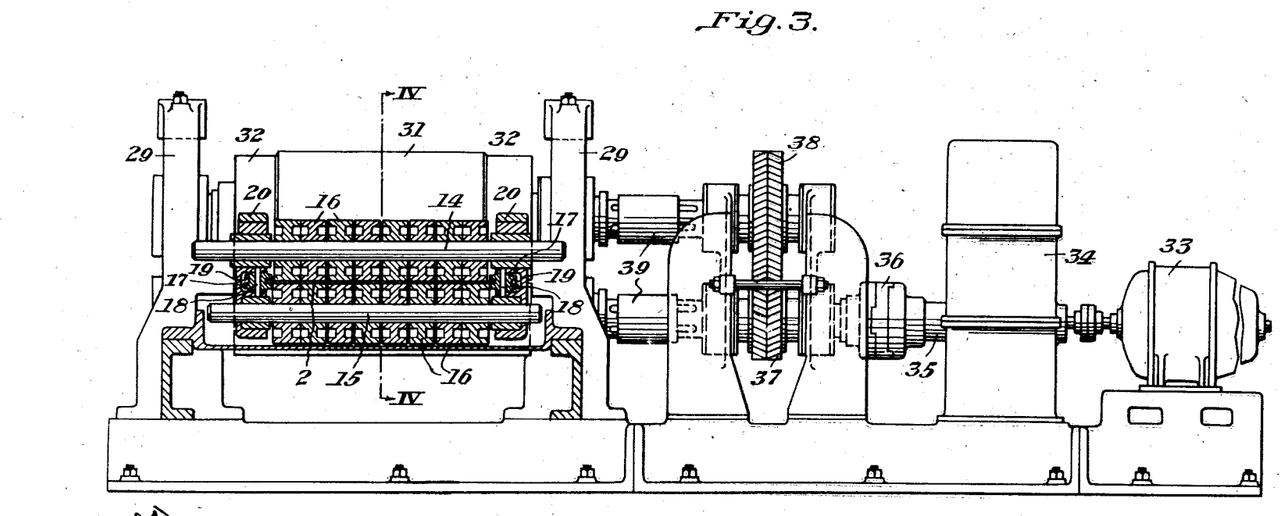
Figure 3 is a view partly in side elevation and partly in section illustrating one form of edge thickening apparatus.
Figure 4:
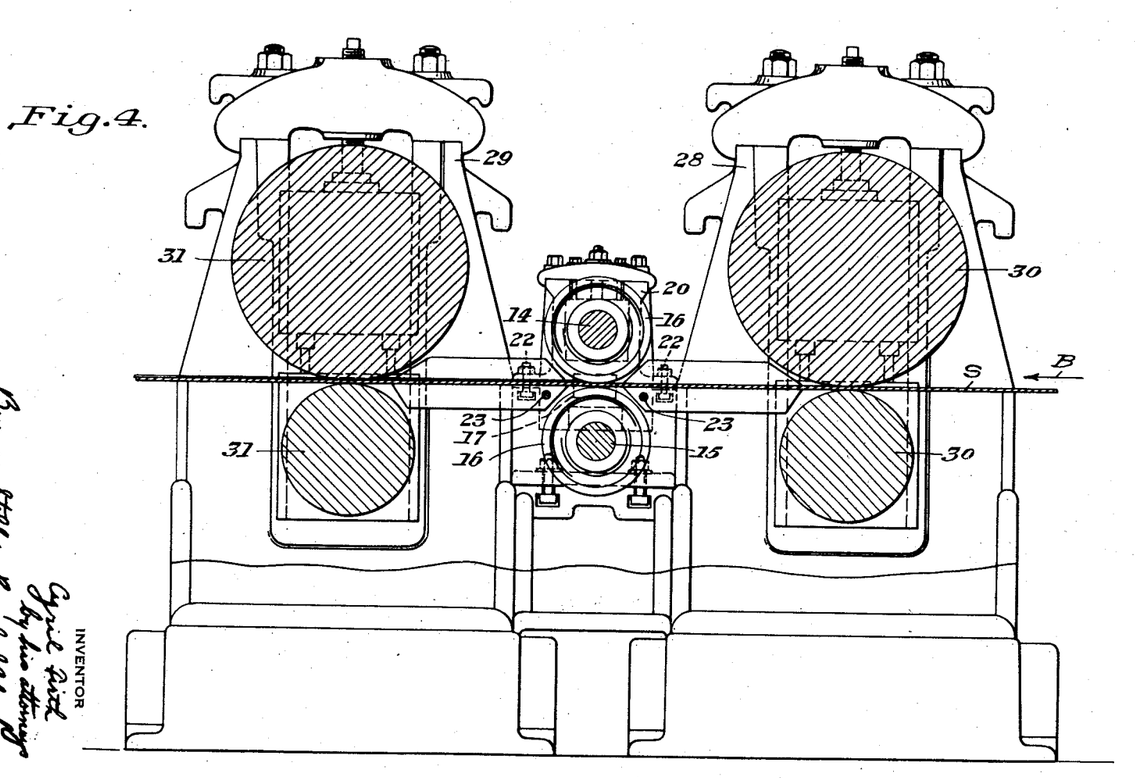
Figure 4 is a vertical sectional view along the line IV—IV of Figure 3, looking in the direction of the arrows.

Referring more particularly to Figure 4 of the drawings, I have illustrated the edge thickening means in position between roll stands 28 and 29, the material being adapted to travel through the apparatus in the direction illustrated by the arrow B. During travel between the rolls 30 of the stand 28, the sheet is reduced to the desired gauge and is substantially flattened. Thereafter it passes to the edge thickening mechanism, from which it travels to the rolls 31 of the stand 29. By reference to Figure 3 of the drawings, it will be apparent that the rolls 31 may have their end portions 32 dressed to properly cooperate with the contour of the edge portions of the sheet as imparted thereto by the edge thickening mechanism.

The stands 28 and 29 may be of generally similar construction, such that both the upper and lower rolls thereof may be driven. In Figure 3, the driving means for one of the stands is illustrated as comprising a motor 33 effective through gearing (not shown) in the speed changing housing 34 for driving a shaft 35. This shaft, in turn, is effective through a universal joint 36 for driving a gear 37 meshing with gear 38, the pitch diameters of which bear such a relation to the roll diameters that the peripheral speed of the rolls is the same. These gears are in turn effective through suitable wobblers 39 for driving the rolls. It will be understood from the foregoing that a similar drive may be provided for each of the roll stands.

Figure 5:
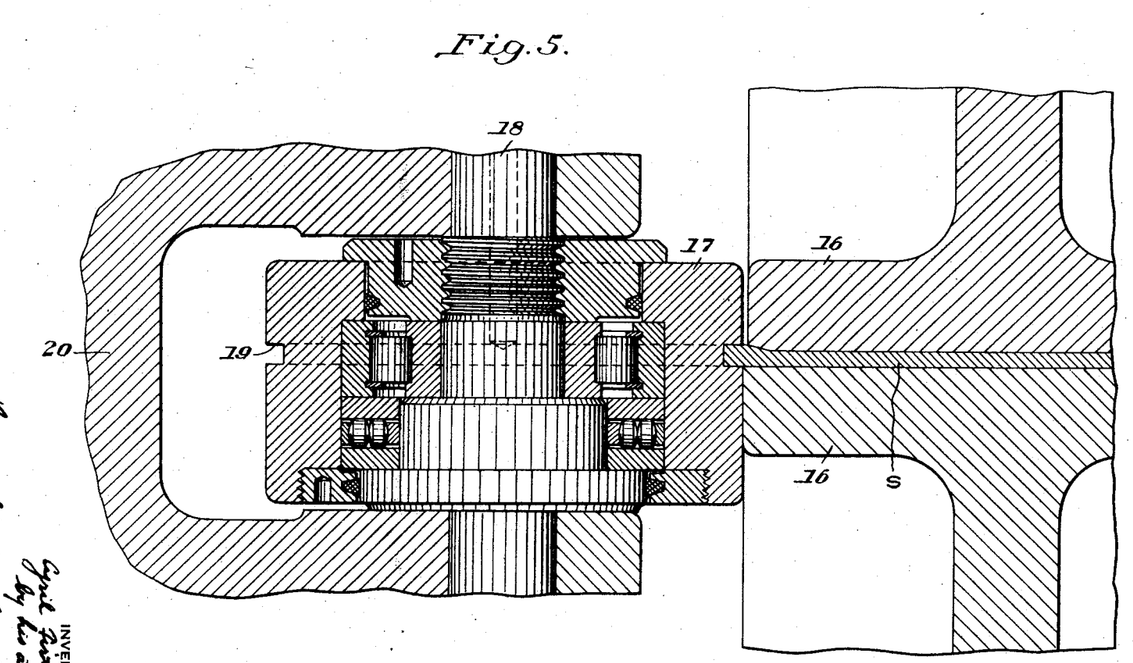
Figure 5 is a detail sectional view on an enlarged scale illustrating a portion of the edge thickening apparatus.

In Figure 5, I have illustrated in greater detail a portion of the edge thickening mechanism. In this figure, I have shown portions of two of the intermediate or body rolls 16, in cooperative relation to one of the edge thickening rolls 17 with its peripheral groove 19. In this figure, the groove is of such shape as to produce an edge thickening operation entirely on the upper surface of the sheet, although any other desired contour may be imparted to the groove for producing a corresponding change in the upsetting operation.

In Figures 9 to 12, both inclusive, there is illustrated a slightly modified embodiment of the invention. The construction shown herein comprises suitable intermediate or body rolls 40 effective on opposite sides of a sheet during its passage between edging rolls 41, which may be of the general construction illustrated in detail in Figure 12. The edging rolls are each mounted in a suitable housing 42 with each of which upper and lower screws 43 cooperate. As will be apparent from the drawings, the upper screw shaft 43 of each pair is extended to receive a crank arm 44, the hub of which carries stops 45 and 46. The lower screw shaft 43 of each pair is likewise extended to receive a lever 47, one end of which is pivotally connected by means of a link 48 to the crank 44. The opposite end of the lever 47 is connected through a link 49 to a piston rod 50, adapted to be actuated by a piston 51 in a cylinder 52. By reason of this construction, it will be apparent that movement of the piston in one direction or the other will be effective for correspondingly rotating the screw shafts 43 and thus moving the housings 42 inwardly or outwardly.

Figures 9, 12:
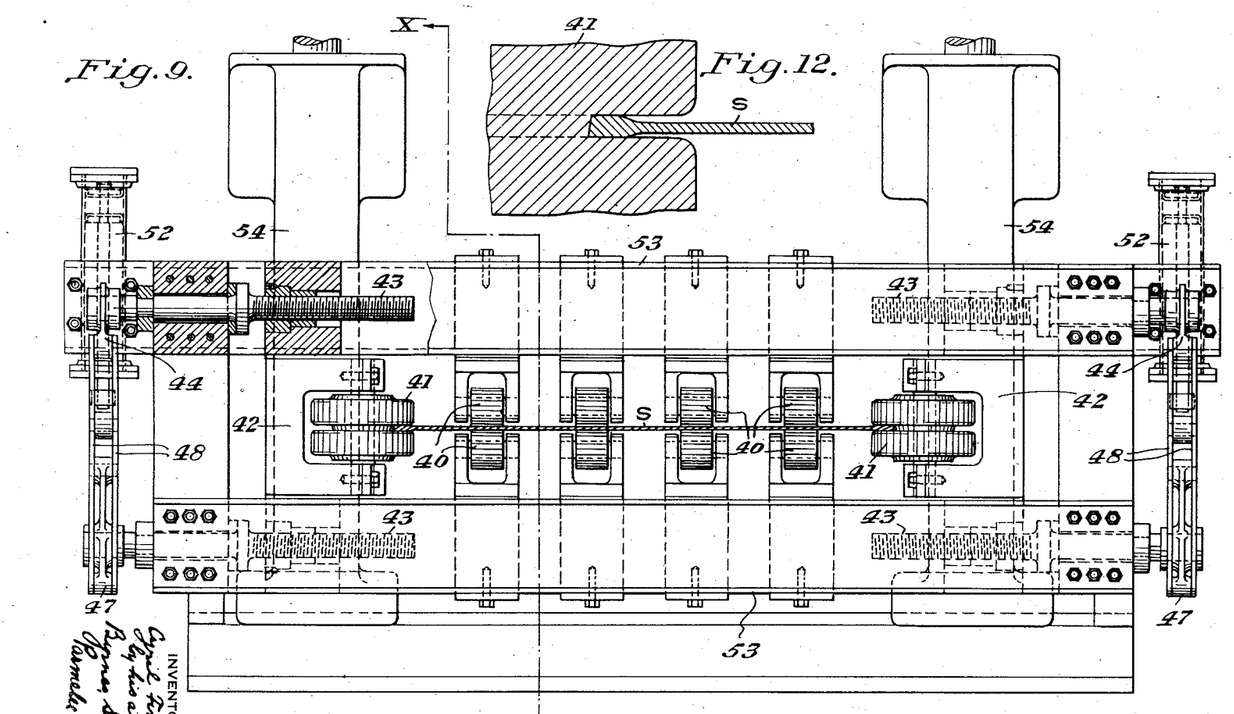
Figure 9 is a view similar to Figure 3, illustrating another form of edge thickening means.
Figure 12 is a detail sectional view on an enlarged scale, illustrating in detail the thickening operation.
Figure 10:
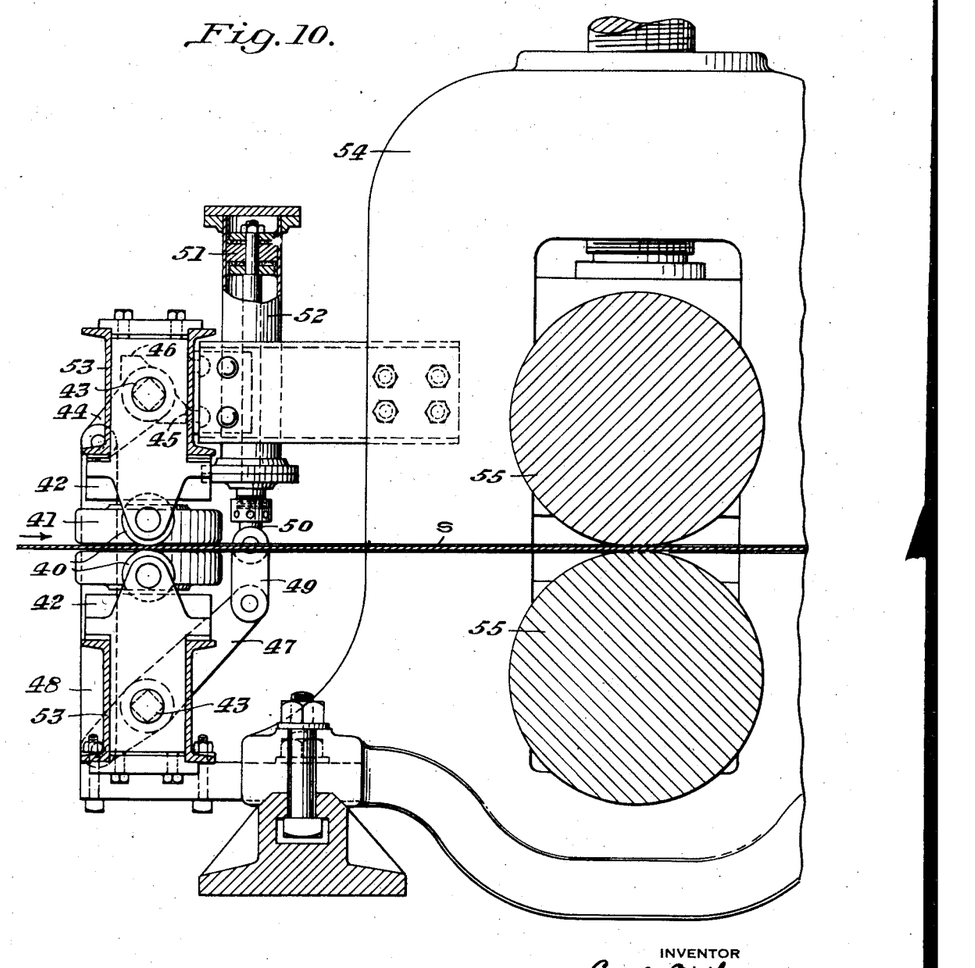
Figure 10 is a transverse sectional view along the line X—X of Figure 9, looking in the direction of the arrows, certain of the parts being broken away.
Figure 11:
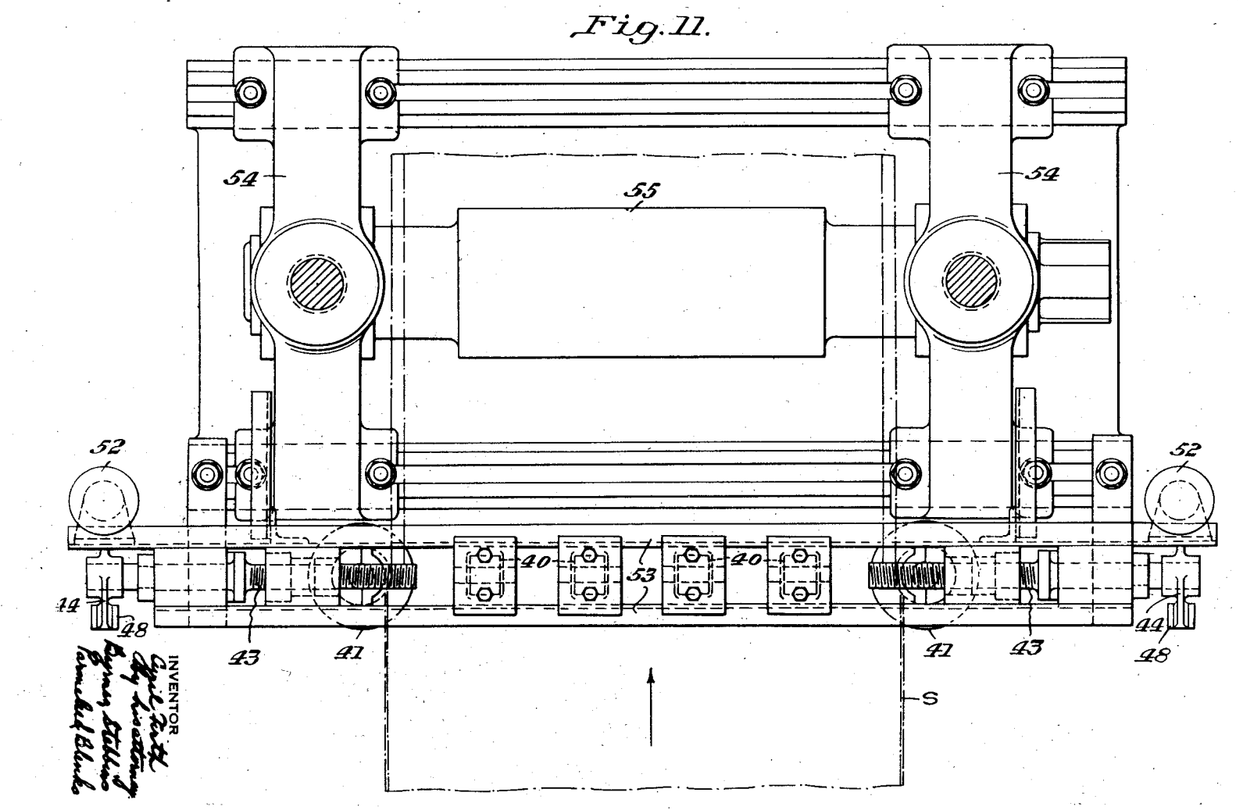
Figure 11 is a top plan view partly in section of the apparatus shown in Figures 9 and 10.

The screw shafts having been properly initially adjusted, the stops 45 and 46 will be effective for limiting the maximum inward and outward movement of the respective housings 42 with which they cooperate. This enables an operator to know the maximum movement which will be imparted by a complete stroke of either of the actuating pistons. It will, of course, be understood that the pistons may be individually or simultaneously operated so as to obtain half of the maximum adjustment or the entire adjustment at will. It will further be apparent that initial adjustment of the parts may be obtained by disconnecting the screw shafts from their operating connections and turning the screw shafts manually inwardly or outwardly.

The frame 53 carrying the housings 42 and the intermediate rolls 40 is illustrated as secured to a roll housing 54 so as to always occupy a predetermined relationship thereto. The mill 54 contains rolls 55, which may be operated in either one direction or the other, depending upon whether it is desired to pull the sheet through the edging mechanism or push the same therethrough. In case of a pulling operation, the rolls will, of course, be so dressed as to properly cooperate with the thickened edge portions.

The detail showing of Figure 12 illustrates the thickening as having been more effective on the upper surface of the sheet than on the lower surface. It will also be noted that in Figure 9 the extent of thickening is shown as being such that the grooves in the edging rolls are substantially completely filled, while in Figure 12, the grooves are only partially filled. The extent of filling will depend upon the inward adjustment of the edging rolls and the extent of upsetting performed thereby.

From the foregoing, it will be understood that either of the edging mechanisms may be utilized in connection with the edge shears and the forming means illustrated more particularly in Figures 1 and 2, and that the mechanisms described in detail constitute but a part of such a complete system. They are effective during operation not only for disposing the desired quantity of metal adjacent the edges of the sheet to be welded, whereby the characteristics of the finished weld are improved, but for accurately sizing the sheets as to width and straightening the edges as to configuration so that proper welding steps may be subsequently performed thereon.

While I have herein illustrated and described certain preferred embodiments of the invention, it will be understood that changes in the construction, arrangement and operation of the parts herein illustrated may be made without departing either from the spirit of the invention or the scope of my broader claims.

I claim:

1. Apparatus for working on metal plates comprising edge trimmers each having a pair of rotary cutters, one cutter being disposed inwardly of the other whereby to form a burr toward the inner cutter, edge thickening means operating on the trimmed edges and effective to flatten the burr and thicken the plate edges, and means for bending the plate into a tube with the burr disposed inwardly thereof.

2. In an apparatus for working on metal plates, the combination with a shear having a pair of opposed, cooperating, rotary cutting discs for trimming an edge of the plates, said discs being effective to form a burr at the edge of the plate projecting at an angle to the plane thereof, of shaping means effective for subsequently flattening the burr, thickening the plate edges, and bending the plates transversely so that the burr extends inwardly of the resulting curved outline of the plate.

3. In an apparatus for working on metal plates, a pair of housings, horizontal transverse members extending between the housings at one side thereof, flatting rolls journaled in said housings defining a flat pass therebetween, housings slidable along said members, rolls journaled vertically in said last-mentioned housings having circumferential grooves effective to thicken the edges of a plate gripped between said first-mentioned rolls, means for adjusting said housings in opposite directions along said members, and horizontal guide rolls journaled on said members cooperating with said flatting rolls and substantially co-planar with said vertical rolls.

4. Apparatus for working metal plates comprising a stand of horizontal flatting rolls defining a flat pass therebetween, vertical edging rolls spaced from said stand along the line of travel of a plate traversing said stand, and horizontal hold-down rolls adapted to engage said plate throughout substantially its entire width, said hold-down rolls having their axes substantially in the plane defined by the axes of the edging rolls, said hold-down rolls being mounted on supports extending transversely of the path of said plate, and said edging rolls being adjustably carried on said supports.

5. The apparatus defined by claim 4 characterized by an additional stand of flatting rolls on the opposite side of the edging rolls from the first-mentioned stand.

CYRIL FIRTH.